Sept. 14, 1943.　　　W. R. FRANK　　　2,329,193

LIFT MECHANISM FOR IMPLEMENTS

Filed Aug. 2, 1941　　　4 Sheets-Sheet 1

Inventor
WILLIAM R. FRANK

By Carlsen & Hazle
Attorneys

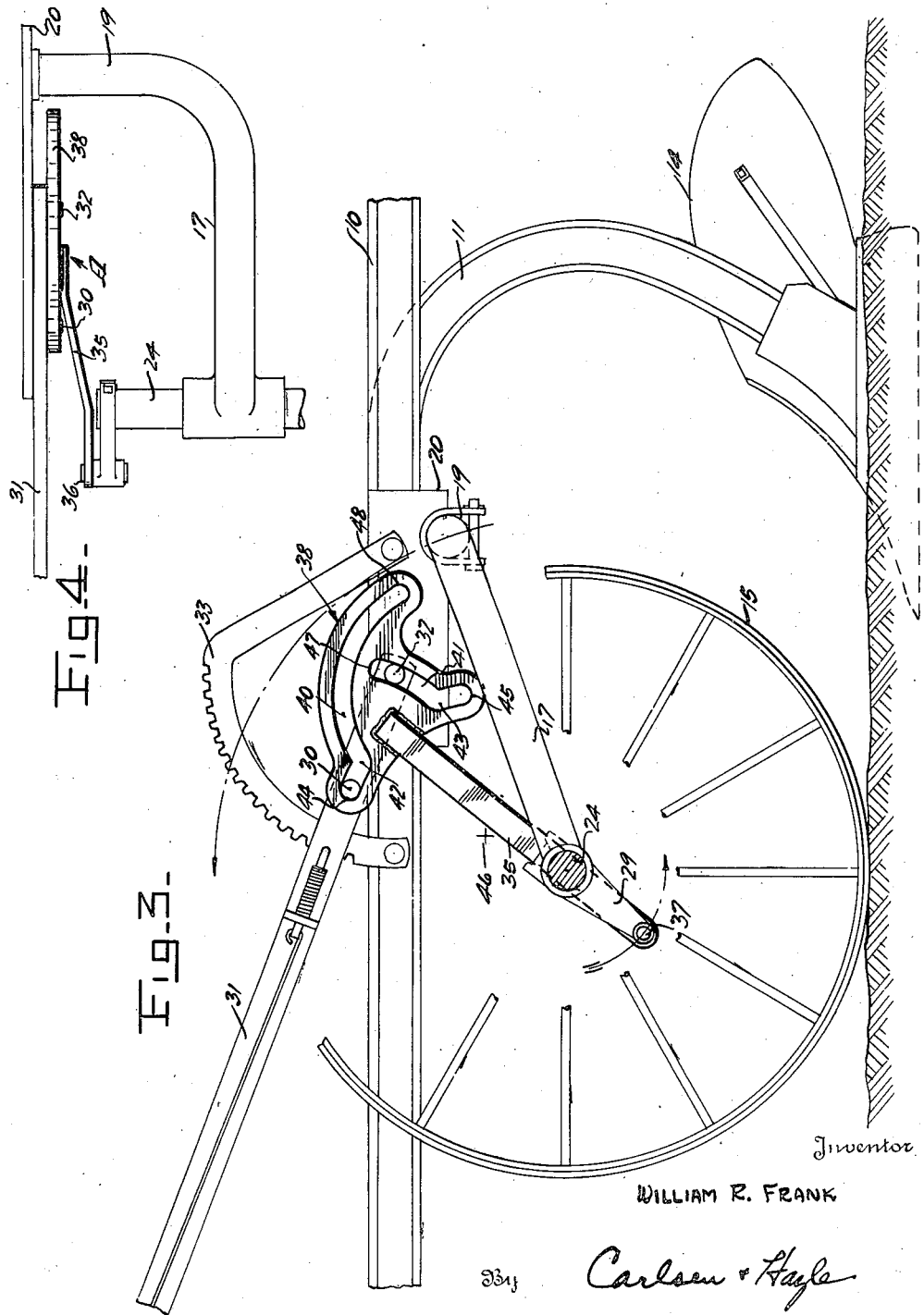

Sept. 14, 1943.  W. R. FRANK  2,329,193
LIFT MECHANISM FOR IMPLEMENTS
Filed Aug. 2, 1941   4 Sheets-Sheet 3

Inventor
WILLIAM R. FRANK

Attorneys

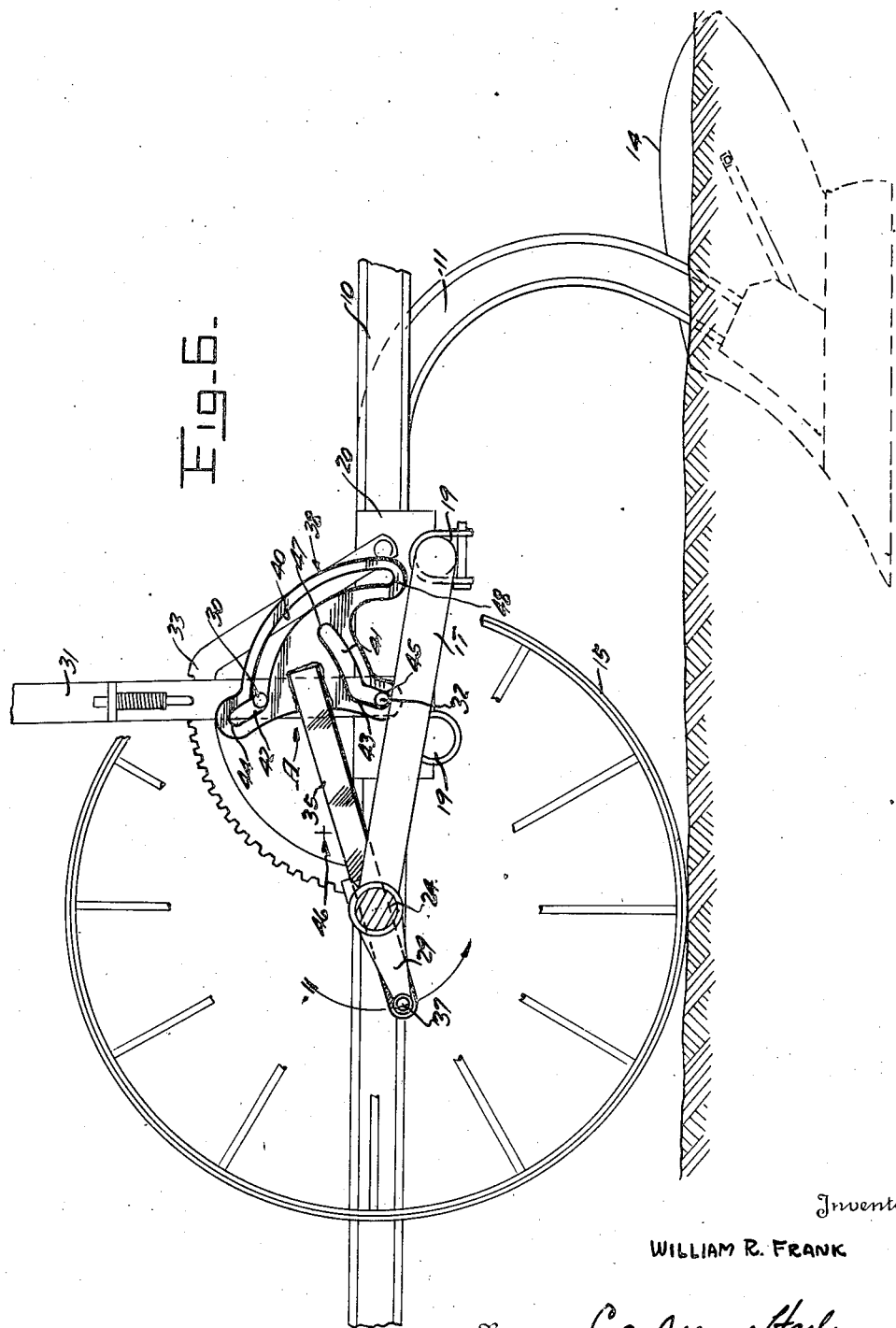

Patented Sept. 14, 1943

2,329,193

UNITED STATES PATENT OFFICE 2,329,193

LIFT MECHANISM FOR IMPLEMENTS

William R. Frank, Moline, Ill., assignor to Minneapolis-Moline Power Implement Company, Minneapolis, Minn., a corporation of Delaware Application August 2, 1941, Serial No. 405,206

22 Claims. (Cl. 97—73)

This invention relates to improvements in lift mechanisms for agricultural implements.

In implements of the type supported by wheel borne crank axles it is customary to raise and lower the implement by operation of a power lift clutch actuated by travel movement of one wheel, such operation serving to swing the crank axles in vertical planes with respect to the implement frame to vertically adjust the implement. A well known example of such implements is the tractor gang plow in which two or more shares are used. In the operation of such implements as at present constructed it is found, however, that the amount of clearance of the shares above the ground, when lifted to transport positions, varies greatly and in accordance with the depth to which the shares penetrate when in plowing positions. Thus when shallow plowing is being done the lifted shares will have high and adequate clearance but when the shares are lowered to deep plowing positions they will not be lifted as far above the ground thus reducing the clearance and sometimes causing an undesirable accumulation of trash upon the shares.

It is the primary object of this invention to provide what may be termed a constant clearance lift mechanism which will operate to lift the shares or tools always to the same height above the ground in transport position no matter how deep they may run when in plowing or working positions. Another object is to provide a device or means for this purpose which is extremely simple, capable of being readily applied to implements having present day power lift clutch constructions and which requires no such precision of fitting or adjustments as to render it impractical for fabrication under the usual plow shop tolerances.

These and other more detailed and specific objects will be disclosed in the course of the following specification, reference being had to the accompanying drawings, in which—

Fig. 3 is a fragmentary side elevation, partially broken away, of the land or left hand side of the plow of Fig. 1, showing my invention applied thereto and with the plow share adjusted to a shallow plowing position.

Fig. 4 is a fragmentary plan view of the land wheel crank axle, land lever, power lift crank arm, connecting link and adjacent parts in the positions shown in Fig. 3.

Fig. 6 is another view similar to Fig. 3 but showing the play shares lowered still further for deep plowing.

Figure 1:
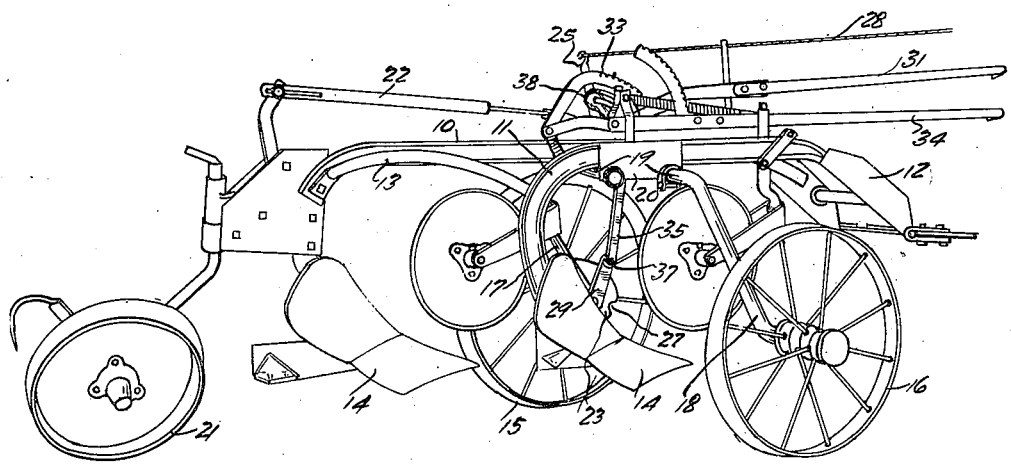
Fig. 1 is a perspective view of a two gang tractor plow embodying my invention.
Figure 2:
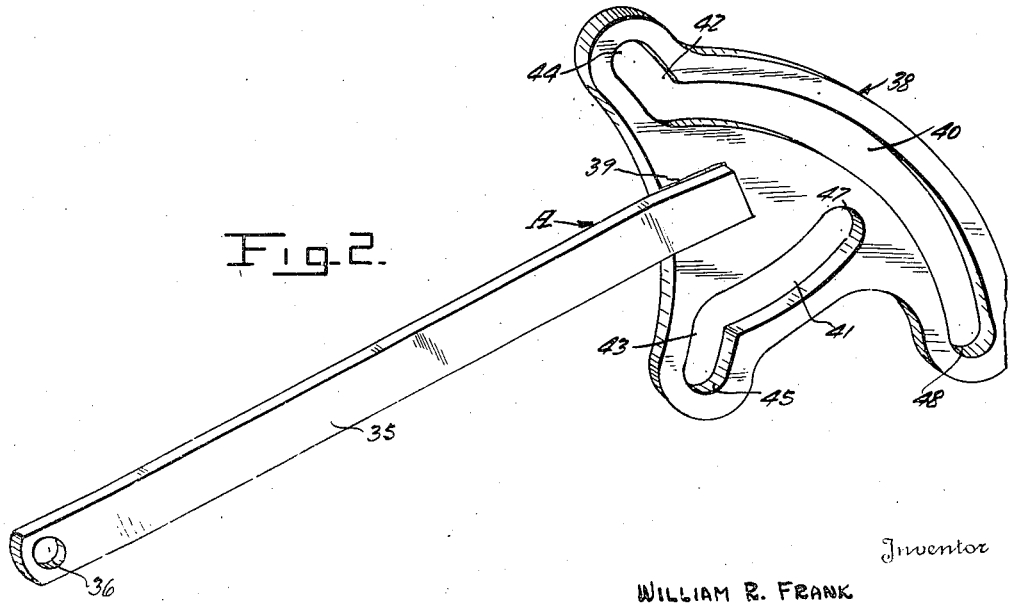
Fig. 2 is an enlarged perspective view of the connecting link which constitutes the operating element of my invention.

Referring now more particularly and by reference characters to the drawings 10 and 11 represent the beams of a conventional form of two gang tractor plow, said beams being connected at forward ends by the hitch attachment 12 and at rear ends by a brace 13 to form a rigid implement frame. The plow shares 14 are secured to rear downwardly curved ends of the beams 10 and 11 in usual fashion.

The implement is supported by a land wheel 15 and furrow wheel 16 which are transversely spaced and are supportably connected to the frame by a land wheel crank axle 17 and furrow wheel crank axle 18. Inwardly turned cranked ends 19 of the axles 17 and 18 are journaled on parallel transverse axes in bearing plates 20 secured to the frame as clearly shown and it will be apparent that, by swinging these axles about the cranks and in vertical planes, the frame and tools 14 may be raised or lowered with respect to the wheels. A rear wheel 21 is also provided and by conventional connection at 22 with the crank axle 17 this wheel is raised and lowered in accordance with movements of the crank axles to maintain longitudinal equilibrium in all positions of the implement.

Usual practice in such implements is to provide a power lift clutch mechanism 23 on a shaft 24 forming the axle for the land wheel 15 and this clutch operates to normally lock the shaft 24 to the crank axle 17 preventing relative movement but may operate to then lock the shaft to the land wheel 15 for rotation through approximately one-half revolution, again lock the shaft to the crank axle and then again lock the shaft to the wheel for another one-half revolution in the same direction whereupon the shaft is locked again to the crank axle, completing one cycle of operation. Rotation, of course, is in the direction of travel movement of the wheel, being counterclockwise as viewed from the land or left hand side of the implement. Locking of the shaft 24 to the crank axle 17 is controlled by a trip lever 25 pivoted at 26 and engaging either of two notches 27 on the periphery of the clutch mechanism. When a trip rope 28 is pulled the trip lever frees one notch, the shaft 24 is locked to the wheel, and it rotates therewith one-half turn until the next notch engages the trip lever, this operation being repeated as often as may be desired.

Also in usual manner the inner end of the shaft 24 carries a rigidly mounted and radially disposed crank or lifting arm 29 which of course rotates with the shaft. Ordinarily then the end of this arm 29 is pivotally connected to a link (not here shown in usual form) which in turn, at an upper end, is pivoted to a point such as represented at 30 on a land wheel adjusting lever 31. Said lever is pivoted at 32 to the implement frame and has a conventional latching engagement with a toothed segment or quadrant 33 secured to the frame. With a link thus connected it is apparent that movement of the lifting arm 29 by the power lift clutch will vary the effective distance between the axis of the land wheel 15 and the point 30 on the lever 31 and such point being locked to the frame by quadrant 33 will cause the entire implement frame to be raised and lowered with respect to the wheel axis to vertically adjust the position of the shares 14.

Transverse level control is secured by a furrow wheel adjusting lever 34 which is connected to actuate the furrow wheel crank axle 18 and suitable interconnection of conventional form as provided between crank axles so that both will move in unison under control of the power lift action after transverse adjustments are made.

The foregoing constitutes the conventional construction which my invention aims to improve. It will be noted that the upper pivot point 30 for the link connecting the lifting arm 29 is subject to adjustment in the vertical plane by movement of the land wheel lever 31 over quadrant 33, as is necessary in order to permit adjustments by the lever of the working depth of the shares 14. However such adjustment of the point 30 will cause a considerable variation in the maximum vertical distance which may be achieved between the frame and the land wheel axis, resulting in a difference in the extent to which the shares may be lifted above the ground. In other words, with the lever adjusted to a shallow plowing position (Fig. 3) the point 30 is lowered with respect to the frame and the lift consequently is greatest as may be understood in Fig. 5. However, when the lever is swung upward to a deeper plowing position, to effectively raise the wheel axis relative to the frame, the point 30 is raised and the downward movement of crank axle 17 to lift the implement consequently is limited, causing a very definite reduction in the height to which the shares will be raised above the ground.

In accordance with my invention I provide a novel form of link connection between lifting arm 29 and lever 31 which will afford a shifting or floating engagement with the lever such as to permit the crank axle 17 to swing to the same transport position, no matter what the depth setting of the lever 31 may be, thus securing a constant clearance for the shares.

I therefore replace the usual connecting link with a link device designated generally at A and comprising a shank or elongated end 35 having an opening 36 for a pivot connection at 37 with the end of the lifting arm 29. The opposite end of the link is widened to provide what may be termed a head, designated generally at 38, and which is here shown as welded at 39 to the shank 35 but which obviously may be made integrally therewith if so desired.

Figure 5:
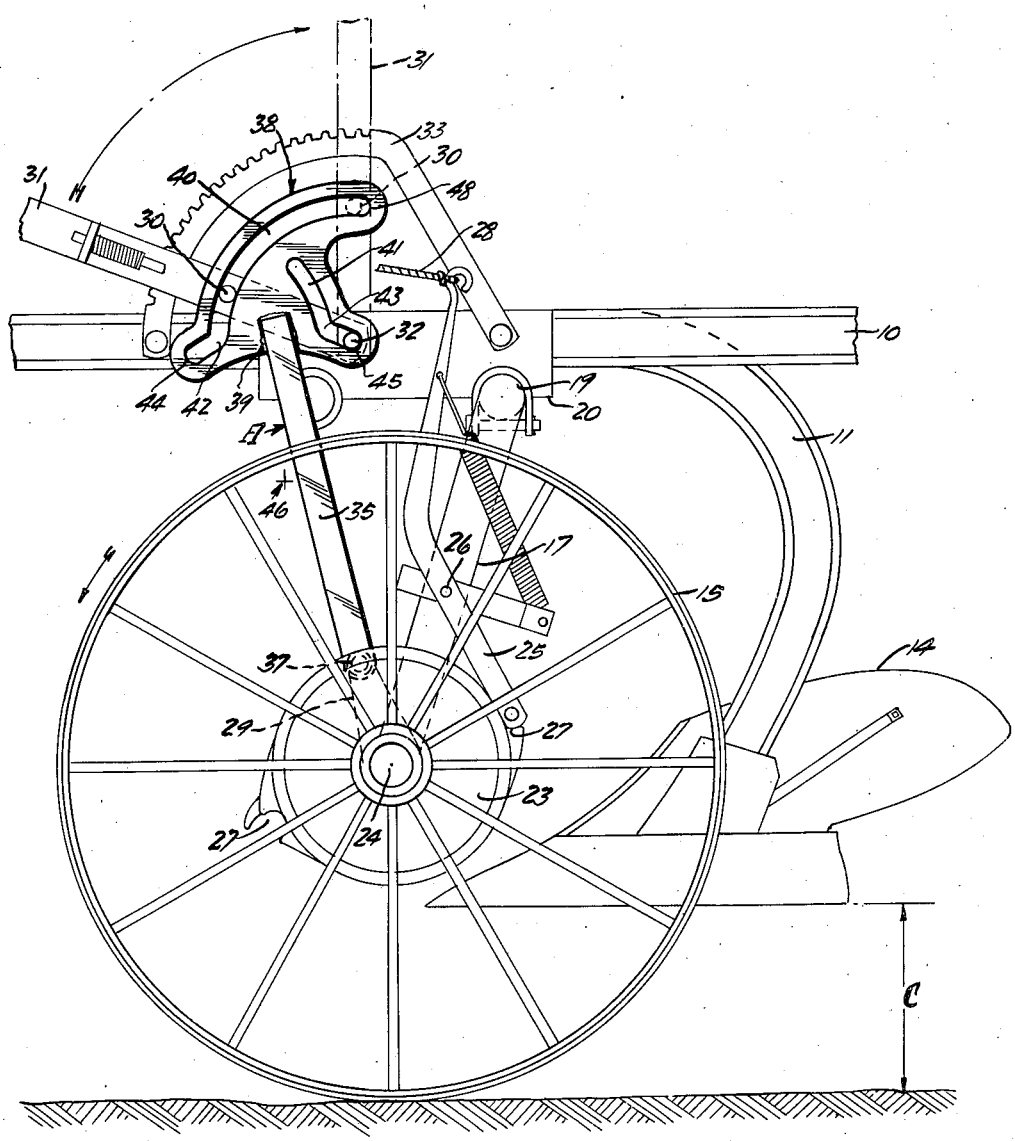
Fig. 5 is a view similar to Fig. 3 but showing the parts adjusted to transport positions with the plow shares lifted above the ground, this view also showing power lift parts not appearing in Fig. 3.

This widened end or head 38 is provided with two arcuate or curved slots 40 and 41 each of which at one end communicate with notches 42 and 43. The radii upon which the slots 40 and 41 are cut are centered in the respective ends of the notches 43 and 42, a rounded end 44 of notch 42 serving as the center for slot 41 while a similarly rounded end 45 of notch 43 represents the center about which the arc of slot 40 is inscribed. The notches themselves are arcuate and turn oppositely away from the respective ends of the slots 40 and 41 along a curved line the radius of which is centered at about the point 46 which, as shown in Figs. 3 and 5, is spaced slightly forwardly of the shank 35. The slots 40—41 thus converge and the outer or upper slot 40 is the longer, running past the end 47 of slot 41 to an end 48 well beyond. The head 38 may be shaped somewhat to conform to the curvature of the slots and notches in order to conserve material. The shank 35 extends along a line passing substantially midway between the notches 42—43.

The radii on which the slots 40—41 are curved correspond in length to the distance between the pivot points 30 and 32 on the land wheel adjusting lever 31 and such points in their adaptation to the use of my invention are constituted by short, laterally projecting studs which are of such diameter as to nicely fit into and play through the slots and notches in the link, such studs being if desired, provided with anti-friction rollers (not shown).

In operation, starting for convenience in explanation from the transport position of Fig. 5, it will be noted first that the parts are so arranged and proportioned that the lower pivot stud 32 rests in the end 45 of notch 43 and the upper stud 32 lies somewhere in the slot 40. The position of this stud 32 in the slot obviously will vary according to the setting of the lever 31, but in the shallow depth setting shown the stud will fall somewhere near the notched end of the slot. The power lift clutch 23 now has the lift arm 29 locked to the crank axle 17 in one of its two operative positions and said crank axle is turned downwardly and only slightly forward thus raising the frame to its fullest extent. The clearance distance between the shares 14 and the ground is represented at C.

Now to lower the plow the trip lever 25 is actuated, setting the power lift clutch in operation to turn the lift arm 29 through approximately one-half of a complete revolution toward its other operative position with respect to the crank axle 17 as seen in Fig. 3. As the lift arm 29 thus moves forwardly and downwardly the entire link A is first rocked on the pivot stud 32 until the stud 30 reaches the notched end of the slot 40 whereupon the rocking movement of the link shifts to a point substantially about the center 46 thus shifting the head 38 bodily along the arcuate line of the notches 42 and 43 until the stud 30 reaches the end 44 of notch 42. At this time the stud 32 has cleared notch 43 and enters slot 41 as the entire link now rocks about the pivot stud 30 until the lift arm 29 completes its one-half turn. The position of the parts is then as appears in Fig. 3 and the lowering of the frame has caused the shares 14 to enter the ground to a shallow depth.

Any tendency of the frame to lower further when in working position is resisted by the positive engagement of the stud 30 with the notch 42 and obviously no rocking movement of the link can take place so long as the lift arm 29 is locked by the power lift clutch to the crank axle 17.

It will further be noted that in each operative position of the lift lever 29 (transport in Fig. 5 or working in Figs. 3 and 6) the link shank 35 comes to rest in longitudinal alignment therewith, the only difference being the jack-knifed condition assumed when in working position. This, however, is more or less coincidental, the more important consideration being the relationship between a line through centers 30 and 37 and the point 24, as will be explained.

To now return the plow to lifted or transport position the trip lever 25 is again operated to cause the power lift clutch to turn the lift arm 29 another half revolution in the same direction and back to the transport position of Fig. 5. The resulting upward and rearward movement of this arm 29 now first rocks the link about the pivot stud 30 until stud 32 reaches the open end of the notch 43 whereupon the entire link rocks about the center 46 shifting it along the arc of the notches 42—43 until the stud 32 reaches the end 45 of the notch 43 whereupon the link rocks on this stud 32 moving the slot 40 over the stud 30 until transport position of the parts is again reached.

Considering now the operation when the shares are set to run deep, the lever 31 is at such time moved upwardly and rearwardly over the quadrant 33 to the position shown in broken lines in Fig. 5 and in full lines in Fig. 6. Obviously, since the center of pivot stud 32 runs as the pivot connection for the upper end of the link at or near transport position of the parts and the stud 30 may play freely through the slot 40 as the lever 31 is adjusted, the transport position of all parts will be absolutely the same at any depth setting.

To lower the plow to working position the trip lever 25 is actuated to cause the power lift clutch to again move the lift arm 29 toward its working position shown in Fig. 6. The resulting forward and downward movement of the lower end of the link now causes the link to rock about the axis of pivot stud 32 and obviously, since the stud 30 in this position of the lever rests near the extreme end 43 of the slot 40, this stud 30 must now move almost the entire length of the slot 40 before it reaches the notch 42. The length of the slot 40 is such that the permissible range of movement thus afforded will cause the crank axle to reach the forwardly and even upwardly angled position shown in Fig. 6 at which point the shares will be lowered to about the maximum depth in the ground. Obviously the rocking movement of the link might shift to the center 46 to move the stud 30 upwardly in the notch 42 and the stud 32 out to the end of slot 41 if the hand lever 31 were set still further forward.

It may be explained that the main force between point 37 and the plow is always between point 37 and stud 30, and the only appreciable force on stud 32, when plowing, is in the form of a binding or wedging action. Such action, which prevents link A from rotating about center 37, is due to the fact that the arc of notches 42 and 43 is not taken about 37, but rather about center 46, which makes the arc 42—43 much too short to allow pivoting of link A about 37. Consequently, although stud 32 may be at the end of notch 43, it does not become the effective pivot point, and if lever 31 were moved slightly forward so as to place studs 32 and 30 at about the center of notches 43 and 42, respectively, then stud 32 would still be carrying the same small load as when in position of Fig. 6, and stud 30 would still be taking the main force, thereby remaining the effective pivot.

The necessity of stud 30 always remaining the effective pivot may be understood by considering that arm 29 must at all times be urged in a counter-clockwise direction (as seen in Figs. 3, 5 and 6), to render the power lift operable. This means that a center line through points 30 and 37 must always fall forward or above point 24. Otherwise, as would be the case if stud 32 were the effective pivot, and upon disengagement of the trip lever, arm 29 would rotate clockwise, thus momentarily causing the plow to go deeper until the lift dog became operative whereupon counter-clockwise rotation of arm 29 would take place until the trip lever again engaged the same notch 27, whereupon the dog would disengage the wheel, thus leaving the plow at exactly the same plowing depth.

The reason for permitting stud 32 to reach the end 45 of notch 43 at maximum depth is to limit rotation of lever A about 46 as very little lifting action takes place during this phase of action, thus wasting, so to speak, the rotation of arm 29. All the rotation possible of 29 is needed during that phase of action when lever A is pivoting about stud 32, during which time the heaviest load is put upon the lift mechanism.

Another reason why stud 30 is the natural and effective pivot may be understood by considering the natural forces acting on lever A. It is obvious that the most effective position from which to resist upward movement of 37 is from a point as nearly above 37 as possible, not from a sidewise angle, such as from 32. Stud 30 is most nearly above 37 and, therefore, will naturally absorb most of the force.

The return to a transport position is accomplished by actuating the trip lever to turn the lift arm back to its starting position (Fig. 5) simply reversing the rocking movement of the link. It will be quite evident, however, that the same clearance height C will be secured in either depth setting of the lever 31, or in any intermediate setting, thus securing a constant clearance at all times when transporting and preventing the accumulation of trash on the shares.

The hand lever 31 may be adjusted when the plow is in transport position without raising or lowering the shares, or it may be adjusted while the plow is in operation to secure immediate depth adjustments of the share. The nature of the cooperating linkage is such that the power lift wheel is effectively locked to the plow in all working positions.

The slotted lever end thus provides a shifting pivot center for the upper end of the link A as a whole, shifting the pivot from a point (30) outward on the lever when the plow is in working position to a point at the pivot of the lever itself when in transport position. Thus the lever has full control of the depth of the tools in their working positions but the link hangs from a point (32) in transport position which is constant or fixed with respect to the frame thus securing the desired constant clearance.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In an implement, a frame, supporting wheels therefor, lifting means between the supporting wheels and frame and including means for rotating a crank, a link pivoted at one end to the crank, an adjusting member movable in an up and down direction about a pivot connection with the frame, and pivot means attaching the other end of the link to said adjusting member for pivotal movement about the said pivot connection of that member or about a point on said member spaced from said connection.

2. In an implement, a frame, supporting wheels connected to the frame, lifting means connecting the wheels and frame and including a rotatable crank, an adjusting member pivotally mounted on the frame for upward and downward movements with respect thereto, a link forming a lifting connection between said crank and adjusting member whereby movement of either will operate to adjust the frame up and down with respect to the wheels, and means for shifting the link connection with respect to the adjusting member in accordance with movements of said crank.

3. In an implement, a frame, a crank axle pivoted at one end to the frame for up and down swinging movements at its other end, a wheel supporting the swinging end of the crank, lift mechanism including a crank arm rotatable about a generally horizontal axis, a lever pivoted at one end for up and down swinging movements with respect to the frame, a link connected between the crank arm and lever, and means on the link for shifting its connection to the lever from the pivoted end thereof to a point spaced radially along the lever from said pivoted end in response to movement of the link by rotation of the crank arm.

4. In an implement, a frame, a wheel supported axle mounted on the frame and supporting the same for up and down movements with respect to the wheel, lifting mechanism including a rotatable lifting arm, a lever pivoted on the frame for up and down swinging movements, the said lever having one pivot connection coincident with the pivot about which it swings and a second pivot connection spaced therefrom, a link connected at one end to the lifting arm, and said link having means for selective pivotal engagement with either of said pivot connections on the lever.

5. In an implement, a frame, a wheel supported axle mounted on the frame and supporting the same for up and down movements with respect to the wheel, lifting mechanism including a lifting arm, a lever pivoted on the frame for swinging movements with respect thereto, the said lever having one pivot connection coincident with the pivot about which it swings and a second pivot connection spaced therefrom, a link connected at one end to the lifting arm, and said link having means at its other end for movably engaging the said pivot connections on the lever and operative to shift the link with respect to both of said pivot connections and angularly with respect to the lever in response to movements of the said lifting arm.

6. The combination in an implement, of a frame, an axle having a supporting wheel and operating to support the frame for up and down movements with respect to the wheel, a lift mechanism mounted on the axle and including a rotatable crank, a link connected at one end to the crank and adapted to be moved upwardly and downwardly with respect to the wheel in response to rotation of said crank, a hand lever adjustable about a pivotal connection with the frame, and means for movably connecting the other end of the link to the lever at two points one of which substantially coincides with the axis of the pivotal connection thereof and the other of which points is spaced along the lever from said axis, said connections permitting angular movement of the link with respect to the lever under action of the rotatable crank.

7. The combination in an implement, of a frame, a crank axle having a ground wheel and supporting the frame for up and down movements with respect to the wheels, a lift mechanism including a rotatable crank, a link connected at one end to the crank and adapted to be moved upwardly and downwardly with respect to the wheel in response to rotation of said crank, a hand lever adjustable up and down about a pivotal connection with the frame, and means connecting the other end of the link to the lever whereby upward and downward movement of the link will cause corresponding adjustment of the frame, said link connecting means including a pair of pins slidable and oscillatably movable in a pair of slots extending in different directions.

8. In an implement, a frame, an axle having a ground wheel and supporting the frame for up and down movements with respect to the wheel, lift mechanism including a lifting arm, a link device connected at a lower end to said lifting arm, a hand lever mounted for up and down movements with respect to the frame about a pivot connection therewith, a pivot member disposed on the lever substantially coaxial with the pivot connection thereof, another pivot member on the lever at a point spaced from said pivot connection, and means at the upper end of the link device for respective pivotal engagement with the said pivot members and operative to move the upper end connection on said pivot members as the lifting arm moves.

9. In an implement, a frame, an axle having a ground wheel and supporting the frame for up and down movements with respect to the wheel, lift mechanism including a lifting arm, a link device connected at a lower end to said lifting arm, a hand lever mounted for up and down movements with respect to the frame about a pivot connection therewith, pivot members disposed in spaced positions on the lever, and means at the upper end of the link device for engaging said pivot members and moving the upper end connection of the link device with respect to both pivot members in response to action of the lifting arm.

10. In an implement, a frame, an axle, a ground wheel on the axle, said axle supporting the frame for upward and downward movements, lift mechanism including a crank, a link connected at a lower end to the crank and movable upwardly and downwardly thereby, a hand lever pivoted to the frame for upward and downward movements with respect thereto, spaced pivot members on the lever, one of said members being fixed with respect to the frame and the other adjustable in response to movement of the lever, and the upper end of the link having means for swinging engagement with the said pivot members.

11. In an implement, a frame, an axle, a ground wheel on the axle, said axle supporting the frame for upward and downward movements, lift mechanism including a vertically movable member, a link connected at a lower end to the said member and movable upwardly and downwardly thereby, a hand lever pivoted to the frame for upward and downward movements with respect thereto, spaced pivot members on the lever, one of said members being fixed with respect to the frame and the other adjustable in response to movement of the lever, and the upper end of the link having slots to engage said pivot members and curved to provide selective pivotal engagement with said members.

12. In an implement, a frame, a wheel supported crank axle connected to the frame supporting the same for up and down movements, lifting mechanism having a rotatable crank, a link connected at a lower end to said crank for up and down movements in response to rotation thereof, a hand lever pivoted for up and down movements with respect to the frame, spaced link pivot members, one of said members being fixed with respect to the frame and the other adjustable by movement of the lever, the upper end of the link having a separate curved slot to engage each pivot member, each of said slots being formed on a radius centered adjacent an end of the other slot so that as either pivot member reaches the end of its slot the other member may slide along the other slot to permit rocking movement of the link.

13. In an implement, a frame, a wheel supported crank axle connected to the frame and supporting the same for up and down movements, lifting mechanism having a rotatable crank, a link connected at a lower end to said crank for up and down movements in response to rotation thereof, a hand lever pivoted for up and down movements with respect to the frame, a pair of spaced link pivot studs, one of said studs being fixed with respect to the frame and the other connected to the lever for up and down movements therewith, the upper end of the link having a separate curved slot for engaging each stud, one end of each slot communicating with a notch to receive one of the pivot studs and act as a pivotal connection for the upper end of the link, and said slots and notches being so shaped and proportioned that the pivot connection of the upper end of the link will be shifted alternately between the fixed and movable pivot studs in response to rotation of the said crank.

14. In an implement, a frame, a wheel supported crank axle on the frame, lift mechanism including a rotatable crank normally locked in either a generally upwardly turned position or generally downwardly turned position with respect to the wheel axis, a link connected at a lower end to the crank for upward and downward movements thereby, a hand lever mounted for up and down movements with respect to the frame, means for selectively and pivotally connecting the upper end of the link to a point fixed on said frame or movable with said lever, and said link being arranged to fall into lengthwise alignment with the crank in either position of the latter.

15. In an implement, a frame, a wheel support movable relative to the frame, a ground wheel on said support, a power lift member connected with the support for actuating the same to raise and lower the frame with respect to the ground wheel, an adjuster member for the wheel support to regulate the operating elevation of the frame with respect to the ground surface, and means connecting the power lift member to the adjuster member including a member self-adjusting with respect to the adjuster member under action of the power lift member to raise the frame to a predetermined elevation above the ground irrespective of the adjusted position of the adjuster member.

16. In a wheel supported implement having a frame and a ground working tool, a pair of pivot connections mounted on the implement, means for adjusting one of said connections to control the operating depth of the tool in the ground, and power lift means operatively associated with both of said connections for raising the tool to a predetermined elevation above the earth irrespective of the adjusted position of said adjustable pivot connection, said power lift means being connected with said pivot connections by a member having slots slidably engaging the respective pivot connections.

17. In a wheel supported implement having a frame and a ground working tool, a tool adjusting mechanism comprising a tool control member adjustably mounted on the frame, a pivot connection mounted on the member so as to be movable therewith, a second pivot connection carried by the frame, power lift means for raising the tool above the ground surface, and a connecting member extending from said power lift means to both of said pivot connections, said tool control member operating through said connecting member to control the working depth of the tool in the ground, and said power lift means being operative through said connecting member to raise the tool to a predetermined position above the ground regardless of the adjusted position of the tool control member.

18. In a wheel supported implement having a frame and a ground working tool, a tool adjusting mechanism comprising a tool control member adjustably mounted on the frame, a pivot connection mounted on the member so as to be movable therewith, a second pivot connection carried by the frame, power lift means for raising the tool above the ground surface, and a connecting member extending from said power lift means to both of said pivot connections, said tool control member operating through said connecting member to control the working depth of the tool in the ground, and said power lift means being operative through said connecting member to raise the tool to a predetermined position above the ground regardless of the adjusted position of the tool control member; and said connecting member having separate guide portions in movable guiding contact with the respective pivot connections.

19. In an implement, a wheel, a frame supported by the wheel, an earth working tool carried by the frame, the frame being vertically adjustable to regulate the working depth of the tool in the ground and to raise the tool to inactive position above the ground, a movable lift connection associated with the wheel, a second movable connection adjustable on the frame, a third connection carried by the frame, and means extending between and connecting all three connections and operated by movement of either of the movable connections to adjust the frame and tool with respect to the ground.

20. In an implement, a wheel, a frame supported by the wheel, an earth working tool carried by the frame, the frame being vertically adjustable to regulate the working depth of the tool in the ground and to raise the tool to inactive position above the ground, a movable lift connection associated with the wheel, a second movable connection adjustable on the frame, a third connection carried by the frame, and means extending between and connecting all three connections and operated by movement of either of the movable connections to adjust the frame and tool with respect to the ground, said connecting means including a member which is movable in arcs about the centers of both second and third mentioned connections.

21. In an implement having a ground wheel and a tool frame supported thereby, a power lift member operating concentrically with the wheel for raising and lowering the frame and tool, a control member on the frame for regulating the working elevation of the tool, and means connecting said power lift and control members and also connected with the frame, said means being operable by either said power lift member or said control member to adjust the frame and tool with respect to the ground surface.

22. In an implement having a ground wheel and a tool frame supported thereby, a power lift member disposed axially of the wheel for raising and lowering the frame and tool, a control member on the frame for regulating the working elevation of the tool, and means connecting said power lift and control members and also connected with the frame, said means being operable by either said power lift member or said control member to adjust the frame and tool with respect to the ground surface, said power lift member being operative to lift the frame and tool to a predetermined height above the ground irrespective of the adjusted position of the control member which regulates the working elevation of the tool.

WILLIAM R. FRANK.